US012623502B2

(12) United States Patent　(10) Patent No.: US 12,623,502 B2

Wu　(45) Date of Patent: May 12, 2026

(54) DUAL-MODE VEHICLE WITH SELECTIVELY ATTACHABLE FLIGHT MODULE AND ENERGY TRANSMISSION CONTROL

(71) Applicant: Guanhao Wu, Jersey City, NJ (US)

(72) Inventor: Guanhao Wu, Jersey City, NJ (US)

( * ) Notice: Subject to any disclaimer, the term of this patent is extended or adjusted under 35 U.S.C. 154(b) by 0 days.

(21) Appl. No.: 19/307,162

(22) Filed: Aug. 22, 2025

(65) Prior Publication Data

US 2025/0375991 A1　Dec. 11, 2025

(51) Int. Cl.
B60F 5/02　(2006.01)

(52) U.S. Cl.
CPC ..................................... B60F 5/02 (2013.01)

(58) Field of Classification Search
CPC ............ B60F 5/02; B64C 37/00; B64U 20/40
See application file for complete search history.

(56) References Cited

U.S. PATENT DOCUMENTS

| | | | | | |
|---|---|---|---|---|---|
| 2,562,491 A | * | 7/1951 | Hall | ......................... | B64C 37/00 244/50 |
| 2,619,184 A | * | 11/1952 | Hall | ......................... | B64C 37/00 180/57 |
| 2,619,301 A | * | 11/1952 | Hall | .......................... | B60F 5/02 244/54 |
| 2,770,427 A | * | 11/1956 | Schreffler | ............... | B64C 37/00 244/2 |
| 2,893,661 A | * | 7/1959 | Aylor | ...................... | B64C 37/00 244/233 |

| | | | | | |
|---|---|---|---|---|---|
| 2,940,688 A | * | 6/1960 | Bland | ...................... | B60F 5/02 114/102.16 |
| 3,065,927 A | * | 11/1962 | Mills | ...................... | B64C 37/00 244/2 |
| 3,083,936 A | * | 4/1963 | Rethorst | ............. | B64C 29/0016 244/49 |
| 3,138,351 A | * | 6/1964 | Zuck | .......................... | B64C 3/56 244/49 |
| 4,165,846 A | * | 8/1979 | Groeger | .................. | B60B 3/048 244/36 |
| 4,358,072 A | * | 11/1982 | Williamson | ............ | B64C 37/00 244/234 |
| 4,627,585 A | * | 12/1986 | Einstein | .................... | B60F 5/02 244/49 |

(Continued)

FOREIGN PATENT DOCUMENTS

| | | |
|---|---|---|
| CN | 107719049 A | 2/2018 |
| RU | 2604750 C2 | 12/2016 |
| WO | 2022011802 A1 | 1/2022 |

OTHER PUBLICATIONS

Aeromobil, www.aeromobil/com [Date accessed: Jun. 23, 2025].

(Continued)

*Primary Examiner* — Medhat Badawi

(74) *Attorney, Agent, or Firm* — Michael J. Feigin, Esq.; Feigin and Fridman LLC

(57)　ABSTRACT

A modular dual-mode vehicle designed for both ground and aerial travel features an automotive chassis with a ground-based driving module with wheels and a motor, and a detachable flight module. The flight module mechanically couples to the vehicle body, enabling airborne operation. A user-operated toggle directs energy from a main power source to either the driving or flight module via a primary transmission system and a common gear box.

22 Claims, 13 Drawing Sheets

(56) References Cited

U.S. PATENT DOCUMENTS

| | | | | |
|---|---|---|---|---|
| 4,881,700 A * | 11/1989 | Sarh | B60F 5/02 | 244/218 |
| 4,899,954 A * | 2/1990 | Pruszenski, Jr. | B60F 5/00 | 244/50 |
| 4,986,493 A * | 1/1991 | Sarh | B64C 37/00 | 244/50 |
| 5,050,817 A * | 9/1991 | Miller | B60F 5/02 | 244/50 |
| 5,141,173 A * | 8/1992 | Lay | B60K 7/0007 | 180/2.2 |
| 5,203,520 A * | 4/1993 | Przygodzki | B64C 37/00 | 244/17.19 |
| D340,426 S * | 10/1993 | Miller | D12/4 | |
| 5,836,541 A * | 11/1998 | Pham | B60F 5/02 | 244/49 |
| 5,915,649 A * | 6/1999 | Head | B64C 37/00 | 244/17.17 |
| 5,984,228 A * | 11/1999 | Pham | B64C 37/00 | 244/49 |
| 6,129,306 A * | 10/2000 | Pham | B64C 37/00 | 244/50 |
| 6,138,943 A * | 10/2000 | Huang | B60F 5/02 | 244/93 |
| 6,619,584 B1 | 9/2003 | Haynes | | |
| 6,877,690 B1 * | 4/2005 | Bragg | B64C 37/00 | 244/219 |
| 7,762,500 B1 * | 7/2010 | Dhall | B64C 37/00 | 244/45 R |
| 7,874,512 B2 * | 1/2011 | Xu | B64C 37/00 | 244/49 |
| 7,938,358 B2 * | 5/2011 | Dietrich | B60F 5/02 | 244/49 |
| 8,453,962 B2 * | 6/2013 | Shaw | B64U 10/60 | 244/17.23 |
| 8,528,852 B2 * | 9/2013 | Farrag | B64C 37/00 | 244/50 |
| 9,156,550 B2 * | 10/2015 | Nam | B64C 3/00 | |
| 9,493,235 B2 * | 11/2016 | Zhou | G05D 1/048 | |
| 9,505,282 B2 * | 11/2016 | Hu | B63B 5/24 | |
| 9,815,345 B2 | 11/2017 | Klein | | |
| 9,844,990 B2 | 12/2017 | Hobert et al. | | |
| D809,970 S * | 2/2018 | Zhou | D12/326 | |
| D821,917 S * | 7/2018 | Zhou | D12/337 | |
| 10,081,424 B2 * | 9/2018 | Radu | B64C 29/0033 | |
| 10,220,686 B2 * | 3/2019 | Baccouche | B60J 5/0479 | |
| 10,518,595 B2 * | 12/2019 | Dietrich | B60F 5/02 | |
| 10,689,105 B2 * | 6/2020 | Romo | B64C 3/56 | |
| 10,787,256 B2 * | 9/2020 | Goelet | B64C 37/00 | |
| 11,027,584 B1 * | 6/2021 | Kiceniuk, Jr. | B60F 5/02 | |
| 11,091,256 B2 * | 8/2021 | Cappelleri | B64U 50/19 | |
| 11,117,658 B2 * | 9/2021 | Neff | B64C 27/08 | |
| 11,179,989 B2 * | 11/2021 | Che | B60F 5/02 | |
| 11,230,363 B2 * | 1/2022 | Klein | B64C 35/008 | |
| 11,312,194 B2 * | 4/2022 | Ker | B60K 6/26 | |
| 11,524,780 B2 * | 12/2022 | Hossain | B64C 3/56 | |
| 11,571,938 B2 * | 2/2023 | Zhou | B64D 25/10 | |
| 11,634,232 B1 * | 4/2023 | Wiegman | B64D 31/18 | 244/53 R |
| 11,738,613 B1 * | 8/2023 | Spikes | B60B 19/02 | 244/2 |
| 11,738,864 B2 * | 8/2023 | Chando | B64U 10/20 | 244/7 A |
| 11,909,279 B1 * | 2/2024 | Wright | H02K 16/00 | |
| 12,122,203 B1 * | 10/2024 | Kuciniek, Jr. | B60G 21/007 | |
| 12,214,862 B2 * | 2/2025 | Auerbach | B64C 13/18 | |
| 12,330,781 B1 * | 6/2025 | Thalheimer | B64C 35/008 | |
| 12,337,954 B1 * | 6/2025 | Kempshall | B64U 60/70 | |
| 12,358,332 B1 * | 7/2025 | Spann | B60F 5/02 | |
| 12,397,935 B2 * | 8/2025 | Fainveits | B64U 20/70 | |
| 2002/0139894 A1 * | 10/2002 | Sorensen | B64C 39/066 | 244/2 |
| 2003/0094536 A1 * | 5/2003 | LaBiche | B64C 37/00 | 244/2 |
| 2004/0104303 A1 * | 6/2004 | Mao | B64C 37/00 | 244/12.5 |
| 2006/0228364 A1 | 10/2006 | Dennis et al. | | |
| 2008/0011897 A1 * | 1/2008 | Xu | B64C 37/00 | 244/2 |
| 2010/0181414 A1 * | 7/2010 | Lopez, Jr. | B64C 29/0033 | 244/12.4 |
| 2010/0270417 A1 | 10/2010 | Goldshteyn | | |
| 2011/0042507 A1 * | 2/2011 | Seiford, Sr. | B64C 29/0025 | 244/2 |
| 2011/0163197 A1 * | 7/2011 | Farrag | B64C 37/00 | 244/2 |
| 2012/0032023 A1 * | 2/2012 | Bousfield | B64C 5/12 | 244/49 |
| 2012/0048989 A1 * | 3/2012 | Eames | B60F 5/02 | 244/2 |
| 2013/0068876 A1 * | 3/2013 | Radu | B60F 5/02 | 244/2 |
| 2013/0193263 A1 * | 8/2013 | Schweighart | B64C 3/56 | 244/49 |
| 2014/0014764 A1 * | 1/2014 | Lundgren | B60F 5/02 | 244/2 |
| 2015/0102155 A1 * | 4/2015 | Krastev | B60K 16/00 | 244/2 |
| 2016/0023527 A1 * | 1/2016 | Dietrich | B64D 35/024 | 244/2 |
| 2016/0052626 A1 * | 2/2016 | Vander Mey | B64C 27/20 | 244/6 |
| 2016/0176256 A1 * | 6/2016 | Gandhi | B64C 3/56 | 244/2 |
| 2016/0207368 A1 * | 7/2016 | Gaonjur | B60F 5/02 | |
| 2016/0229534 A1 * | 8/2016 | Hutson | B64C 25/38 | |
| 2016/0243910 A1 * | 8/2016 | Hu | B64C 27/30 | |
| 2016/0272314 A1 * | 9/2016 | Radu | B60F 5/02 | |
| 2016/0311282 A1 * | 10/2016 | Nam | B60F 5/02 | |
| 2017/0072755 A1 * | 3/2017 | Zhou | G05D 1/0816 | |
| 2017/0158324 A1 * | 6/2017 | Schlak | B64C 29/0033 | |
| 2017/0217586 A1 * | 8/2017 | Goelet | B64D 27/12 | |
| 2018/0056743 A1 * | 3/2018 | Zhou | B64C 13/18 | |
| 2018/0127104 A1 * | 5/2018 | Kobayashi | B64D 27/351 | |
| 2019/0009626 A1 * | 1/2019 | Nolan | B62D 21/183 | |
| 2019/0121371 A1 * | 4/2019 | Russell | G08G 5/54 | |
| 2019/0160901 A1 * | 5/2019 | Doyle | B64C 3/56 | |
| 2019/0300170 A1 * | 10/2019 | Bousfield | B64C 37/00 | |
| 2020/0172234 A1 * | 6/2020 | Neff | B64C 37/00 | |
| 2020/0207469 A1 * | 7/2020 | Benedict | B60F 5/02 | |
| 2021/0129981 A1 * | 5/2021 | Sun | B64U 30/12 | |
| 2021/0300535 A1 * | 9/2021 | Petrov | B64C 3/26 | |
| 2021/0300546 A1 * | 9/2021 | Kisly | B64C 37/00 | |
| 2021/0309059 A1 * | 10/2021 | Ker | F04D 29/563 | |
| 2022/0041280 A1 * | 2/2022 | Tian | B64C 37/00 | |
| 2022/0242181 A1 * | 8/2022 | Che | B60F 5/003 | |
| 2022/0242182 A1 * | 8/2022 | Karadia | B64C 37/00 | |
| 2022/0371728 A1 * | 11/2022 | Hirabayashi | B60F 5/02 | |
| 2022/0396375 A1 * | 12/2022 | Lee | B60L 53/30 | |
| 2022/0402604 A1 * | 12/2022 | Sathya | B64C 37/02 | |
| 2023/0001756 A1 * | 1/2023 | Hwang | E04H 6/22 | |
| 2023/0032211 A1 * | 2/2023 | Kondo | B60F 3/00 | |
| 2023/0034488 A1 * | 2/2023 | Sathya | G05D 1/81 | |
| 2023/0058202 A1 * | 2/2023 | Abdellatif | G01N 29/04 | |
| 2023/0085329 A1 * | 3/2023 | Zhou | B60F 5/02 | 244/2 |
| 2023/0114587 A1 * | 4/2023 | Walker | B60F 5/02 | 244/2 |
| 2023/0121833 A1 * | 4/2023 | Watanabe | B64C 37/00 | 244/101 |
| 2023/0139354 A1 * | 5/2023 | Auerbach | G05D 1/652 | 701/14 |
| 2023/0144699 A1 * | 5/2023 | Kipnis | B64D 35/023 | 244/2 |
| 2023/0221717 A1 * | 7/2023 | Shen | A01K 61/80 | 114/255 |
| 2023/0356835 A1 * | 11/2023 | Russell | G08G 5/34 | |
| 2024/0075779 A1 * | 3/2024 | Han | B64C 25/62 | |
| 2024/0076065 A1 * | 3/2024 | Torgersen | B64U 30/297 | |
| 2024/0092336 A1 * | 3/2024 | Rivas Pinilla | B60V 1/11 | |
| 2024/0123781 A1 * | 4/2024 | Zecos | B64C 11/46 | |

(56) References Cited

U.S. PATENT DOCUMENTS

| | | | | |
|---|---|---|---|---|
| 2024/0181825 | A1* | 6/2024 | Rocha | B60F 5/02 |
| 2024/0227479 | A1* | 7/2024 | Mack | B64U 50/19 |
| 2024/0262145 | A1* | 8/2024 | Kitagawa | B62D 57/032 |
| 2024/0346940 | A1* | 10/2024 | Fu | B60F 5/02 |
| 2024/0351386 | A1* | 10/2024 | Hiwatashi | B60F 5/02 |
| 2024/0351683 | A1* | 10/2024 | Shin | B64C 37/00 |
| 2025/0206091 | A1* | 6/2025 | Pitroda | B64C 37/00 |

OTHER PUBLICATIONS

EHang_Autonomous Aerial Vehicle (AAV) Innovator for Urban Air Mobility (UAM), https://www.ehang.com/uam [Date accessed: Jun. 23, 2025].

GAC Group Helps Build Strategic Emerging Industries in Low-altitude Economy Actively Promotes the Development of New Quality Productivity, Mar. 8, 2024 21:46:33. www.gacgroup.com/cn/news/detail?baseid=18734 [Date accessed: Jun. 23, 2025].

Electric Aerial Ridesharing. https://www.jobyaviation.com/ [Date accessed: Jun. 23, 2025].

[Date accessed: Jun. 23, 2025]. Klein Vision—Flying Car, Press Release May 8, 2025. https://www.klein-vision.com/ [Date accessed: Jun. 23, 2025].

Luftcar—Powered by Hydrogen. "When an electric ground vehicle and a hydrogen fueled airframe come together, the result could be an elegant solution for cargo and personal transport."—Aviation Week Nov. 2021. https://www.luftcar.com [Date accessed: Jun. 23, 2025].

Talyn Air—Automate the Middle Mile: Competitive Cargo Delivery without Compromise. https://www.talyn.com/ [Date accessed: Jun. 23, 2025].

Terrafigoa Transition—Wikipedia. https://en.wikipedia.org/w/index.php?title=Terrafugia_Transition&oldid=1278907224 [Date accessed: Jun. 23, 2025].

Volocopter brings urban air mobility to life. https://www.volocopter.com/en [Date accessed: Jun. 23, 2025].

* cited by examiner

DUAL-MODE VEHICLE WITH SELECTIVELY ATTACHABLE FLIGHT MODULE AND ENERGY TRANSMISSION CONTROL

FIELD OF THE DISCLOSED TECHNOLOGY

The present technology relates to the field of vehicular travel and energy transmission systems there-for, and, more specifically, to the field of terrestrial vehicles with provisions for aeronautical travel

BACKGROUND

Flying cars, also referred to as roadable aircraft or hybrid ground-air vehicles, have long been envisioned as a solution to transportation congestion and efficiency. Numerous designs have been proposed and developed that attempt to combine terrestrial drivability with aerial capability. A common approach in existing flying car systems involves the integration of folding or retractable wings, which may extend laterally from the vehicle body for flight and retract or fold along the sides for ground travel. These systems seek to minimize the spatial footprint of the vehicle during terrestrial use while still providing sufficient lift during flight.

However, folding-wing configurations present several engineering and practical challenges. The mechanical complexity required to deploy and retract wings reliably adds significant weight and introduces failure points that can compromise safety. Additionally, such systems typically require substantial structural reinforcement in the vehicle body to accommodate the forces involved in flight, which can reduce overall vehicle efficiency. The folding mechanisms themselves often consume internal vehicle space and necessitate lengthy transition procedures that are not conducive to rapid deployment or operation in constrained urban environments. This fixed design limits flexibility, complicates maintenance, and may reduce the versatility of the vehicle for users who do not require constant flight capability.

There is thus a need in the art for flying cars that combine the advents of existing technology while further increasing flexibility, modularity, energy efficiency, and safety redundancies, whilst mitigating associated costs.

SUMMARY

A vehicle according to the disclosed technology enables both terrestrial and aerial travel through a modular and user-controlled configuration. The vehicle comprises a vehicle body with a chassis and a driving module, where the chassis may take the form of a conventional automobile body featuring passenger seating and operable doors. The driving module includes at least one pair of wheels connected by a common axle and is designed for ground-based travel. A motor housed within the vehicle body converts energy from a primary energy storage, such as a battery, fuel tank, or other source, into mechanical energy.

A selectively attachable and mechanically coupleable flight module enables aeronautical travel without permanently burdening the vehicle with heavy flight components. The flight module may include wings, propellers, thrusters, or other flight-inducing structures. "Mechanically coupleable" is defined as "able to be adjoined or connected in a manner that enables transference of mechanical force, energy, or motion". For example, wings attached to the vehicle body are said to be "mechanically coupleable", as lift generated via airflow about the profile of the wings acts upon the car body, allowing for flight of both the wings and the car body. When the module is detached, the vehicle operates as a lightweight, energy-efficient ground vehicle. This modular approach overcomes limitations of conventional flying cars with integrated folding wings, which add structural complexity, weight, and mechanical failure points.

Mechanical energy from the motor is selectively directed to either the axle (for driving) or the flight module (for flying) via a primary transmission system, under control of a user-operated toggle. The toggle switches between a first state that powers the axle for terrestrial motion, and a second state that powers the flight module for aerial movement. Described differently, the first state of the toggle activates terrestrial driving by directing energy to the axle to turn the ground-contacting wheels, whereas the second state of the toggle directs energy to the flight module for aeronautical travel. This user-controlled toggle enables seamless switching between driving and flying, with fewer moving parts than folding-wing systems and without requiring simultaneous propulsion of both modules unless desired.

In some embodiments, the flight module includes at least one of wings, propellers, and thrusters. The flight module may further comprise a secondary energy storage and a secondary transmission system, the latter being configured to transmit mechanical energy from the secondary energy storage to the flight module. In such embodiments, the primary and secondary transmission systems may be designed to simultaneously transmit mechanical energy to the flight module. This is particularly advantageous in scenarios where the primary energy storage lacks sufficient energy to provide for the intended functions of the vehicle. The primary energy storage and the secondary energy storage may be electrically connected to one another to allow for bidirectional energy transfer between the energy storages, enhancing operational flexibility. In certain scenarios, the primary energy storage may supply energy to both the primary and secondary transmission systems in the event that the secondary energy storage fails to enable the secondary transmission system to power the flight module. Conversely, the secondary energy storage may supply energy to both transmission systems in the event that the primary energy storage fails to enable the primary transmission system to power the driving module. The added redundancy increases safety of the disclosed technology.

The flight module may connect to the vehicle body via contacting a central point of each wheel, each wheel being in turn connected to the vehicle body. Alternatively, the flight module by connect to the vehicle body at a plurality of points disposed on the vehicle body. The interface of the flight module and the wheels may have a bearing that allows for the wheel to rotate while within while the attached flight module does not rotate. In some implementations, the flight module includes a lift-generating propeller and a horizontal-thrust-generating propeller, the thrust generating propeller adjoined to a lift-generating wing, with the thrust and lift propellers being separate. The thrust-generating propeller may be coupled to the connecting axle via a plurality of rotating shafts. Each rotating shaft of the plurality may be connected to at least one other rotating shaft of the plurality by way of a universal joint that allows for freedom of movement in two dimensions. This arrangement enables torque to be transmitted along a path that is not strictly linear, "torque" being defined as "force causing rotation of a target object", as is known in the art.

During automotive travel of the vehicle, the motor causes rotation of a shaft, which, in some embodiments, interfaces with gearing and internal motor axles/shafts to rotate the connecting axle and at least one pair of wheels. The motor may be switchable to interface with gearing, axles, and drivetrain components for the thrust generating propeller, such that activation of the same motor, may, depending on the state of the motor, cause either automotive or aeronautical travel of the vehicle. In some embodiments, at least one rotating shaft of the plurality is extended from a location within the vehicle body to a location exterior to the vehicle body. The plurality of rotating shafts may be arranged such that each rotating shaft is angularly offset at an obtuse angle relative to an adjacent rotating shaft, thereby facilitating the routing of the torque transmission path between the chassis of the vehicle and the flight module.

The thrust-generating propeller's rotational axis may be equidistant from two rear corners of the chassis. The lift and thrust propellers may be offset 90 degrees from one another, with the extremity of the thrust propeller reaching a point higher than the highest point of the lift propeller. Further embodiments comprise sets of propellers disposed at various points exterior to the vehicle body. Furthermore, multiple thrust generating propellers may each be connected to the axle via individual gears and joints, with individual rotating shafts disposed for each set of propeller, gear, and joint.

A method of using the vehicle includes steps of mechanically coupling the flight module to the vehicle, setting the user-operated toggle to the first state, and automotively accelerating the vehicle by transmitting mechanical energy from the primary energy storage to the driving module via the primary transmission system. The toggle is then switched to the second state, after which mechanical energy is supplied from the primary energy storage to the flight module through the primary transmission system. Vehicular acceleration via the driving module is ceased, lift is generated by the flight module, and the vehicle takes off, such that the pair of wheels lose contact with the ground and the vehicle becomes airborne. In some embodiments, between supplying energy to the flight module and ceasing automotive acceleration, the vehicle produces acceleration via both the driving module and the flight module using energy from the primary transmission system. After flight, the method may further include reducing mechanical energy to the flight module, descending, reestablishing ground contact with the wheels, switching the toggle back to the first state, ceasing mechanical energy to the flight module, supplying energy exclusively to the driving module via the primary transmission system, and resuming automotive travel.

In embodiments including a secondary transmission system, a method of use includes mechanically coupling the flight module to the vehicle, setting the toggle to the first state, and accelerating the vehicle using mechanical energy transmitted via the primary transmission system. The toggle is then switched to the second state, and mechanical energy is simultaneously supplied to the flight module from both the primary energy storage (via the primary transmission system) and the secondary energy storage (via the secondary transmission system). Mechanical energy transfer to the driving module is ceased, lift is generated, and the vehicle becomes airborne. At any point during the method, an energetic connection may be established between the primary and secondary energy storages, enabling energy to be transferred from one to the other in either direction. The method may further include ceasing energy transfer via the secondary transmission system, reducing mechanical energy to the flight module, descending, contacting the ground, switching the toggle back to the first state, ceasing energy to the flight module, and resuming exclusive mechanical energy delivery to the driving module via either or both transmission systems, thereby enabling resumption of automotive travel.

Alternatively, a method of use of the disclosed technology includes mechanically coupling the flight module to the vehicle body, setting the user-operated toggle to the second state, and supplying mechanical energy from the primary energy storage, and, in some embodiments, the secondary energy storage, to the flight module via the primary transmission system, or via both the primary and secondary transmission systems, to generate lift via the flight module. The generated lift then causes the vehicle to take-off and become airborne, such that the wheels lose contact with the ground and the vehicle is airborne. Described differently, the vehicle may be capable of initiating take-off directly from being stationary, without the need to accelerate perpendicularly to Earth's gravity on an elongated roadway or runway. This feature renders the disclosed technology particularly flexible and practical for use in dense urban environments, where horizontal clearance is limited. To land, the mechanical energy supplied to the flight module via the primary transmission system may be reduced, such that the vehicle descends and the wheels contact the ground.

DETAILED DESCRIPTION OF EMBODIMENTS OF THE DISCLOSED TECHNOLOGY

The disclosed technology is a modular dual-mode vehicle for both terrestrial and aerial travel. The vehicle has a conventional automotive chassis integrated with a driving module and a selectively attachable flight module, enabling the user to transition between ground-based and airborne modes. The chassis may feature standard automotive elements such as seating and operable doors, while the driving module includes at least one pair of wheels connected by an axle and driven by a motor that converts stored energy— such as from a battery or fuel tank—into mechanical motion. The flight module, which may include wings, thrusters, or propellers, is mechanically coupleable to the vehicle body, allowing mechanical force and lift to be transferred to the chassis during flight.

A user-operated toggle governs the energy delivery from a primary energy source, selectively transmitting mechanical energy to either the driving module or the flight module via a primary transmission system. In some embodiments, a secondary energy storage and transmission system may supplement or replace the primary system to power the flight module, enabling redundancy and bidirectional energy sharing. This modular configuration allows the vehicle to operate as a lightweight, energy-efficient ground vehicle when the flight module is detached, and to take flight when the module is attached and activated, thereby offering a simplified, reliable alternative to conventional integrated flying car designs with fewer failure points and greater operational flexibility.

Embodiments of the disclosed technology will become clear with the following discussion of the drawings hereinbelow.

Figure 1:
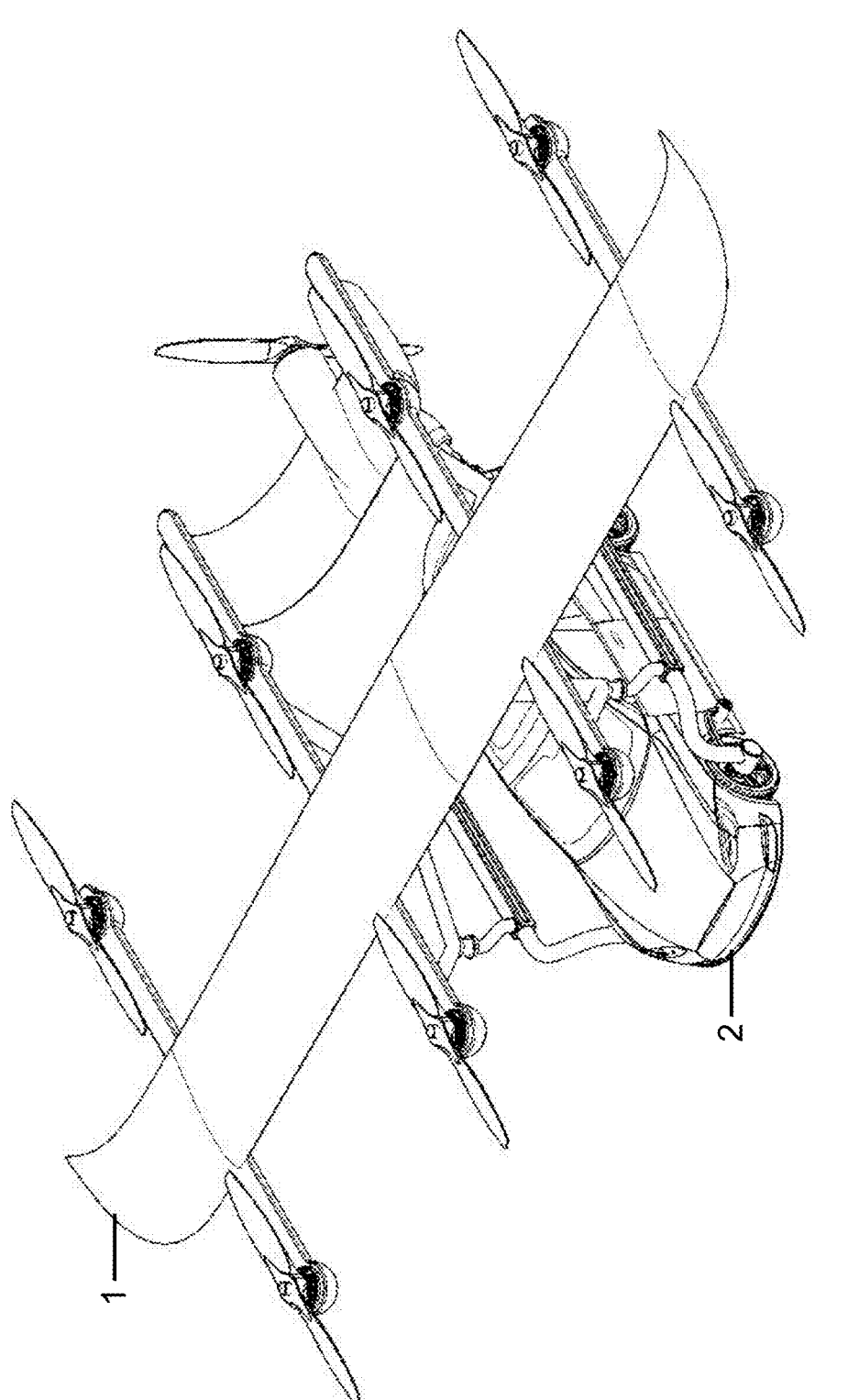
FIG. 1 is a top and side perspective view of a car with a flight module attached thereto in an embodiment of the disclosed technology.

Turning now to the drawings, FIG. 1 illustrates a top and side perspective view of a dual-mode vehicle in an embodiment of the disclosed technology. In this embodiment, the vehicle comprises a car body 2 to which a flight module 1 is mechanically coupled. The configuration shown in FIG. 1 provides an overview of the system in its combined, airborne-capable state, wherein the car body 2 and flight module 1 are connected to enable aeronautical travel. While FIG. 1 presents a high-level depiction of the overall system, greater structural and functional detail of the individual components is presented in FIGS. 2 through 4, as described below.

Figures 2, 3:
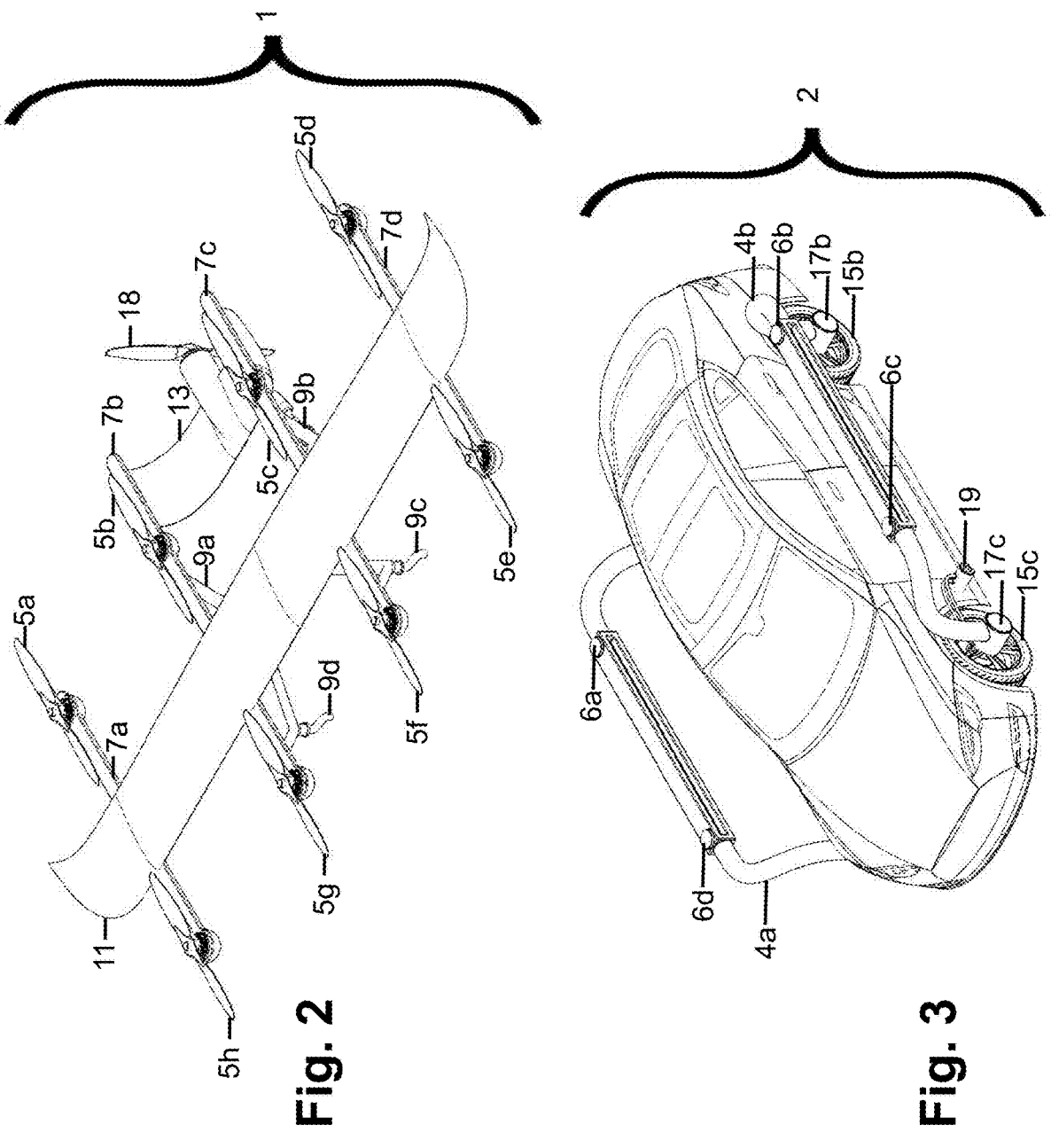
FIG. 2 is a top and side perspective view of the flight module of FIG. 1 in an embodiment of the disclosed technology.
FIG. 3 is a top and side perspective view of the car of FIG. 1 in an embodiment of the disclosed technology.

Turning now to FIG. 2, FIG. 2 is a top and side perspective view of the flight module of FIG. 1 in an embodiment of the disclosed technology. A lateral wing 11 four parallel, longitudinal propeller frames 7a-7d, atop which eight propellers 5a-5h are disposed. The wing 11 is shaped to generate lift via the Bernoulli principle, as is known in the art. Similarly, the propellers 5a, 5b, 5c, 5d, 5e, 5f, 5g, and 5h (hereafter referred to as 5a-5h) generate lift, though embodiments of the technology may include elevators, ailerons, and/or both clockwise and counterclockwise rotational motion capabilities of the propellers 5a-5h to generate force accelerating the descent of an airborne car 2 and air module 1 as shown in FIG. 1. While lift often refers to a force directionally opposite from Earth's gravitational force, "lift", for purposes of this disclosure, is defined as "a non-gravitational force having a largest vector component pointing parallel or anti-parallel to the force vector of Earth's gravitational pull, the force being required to initiate, sustain, and/or terminate the airborne state of the dual-mode vehicle", such as shown in FIG. 1.

The propellers 5a, 5b, 5c, 5d, 5e, 5f, 5g, and 5h are disposed in a rectangular arrangement, whereby the eight propellers are organized into two parallel rows of four propellers each. This two-by-four configuration forms a generally rectangular perimeter around the upper portion of the vehicle, particularly above the connection frames 4a and 4b. The rectangular perimeter formed by the propellers 5a-5h has a longest edge perpendicular to a longest edge of the connection frames 4a and 4b. Each row of four propellers is aligned longitudinally along the length of the car, with the rows spaced laterally apart from one another on opposing sides of the vehicle chassis.

In certain embodiments, each propeller is positioned equidistantly from respective neighboring propellers within the same row and between rows, such that the spacing between adjacent propellers is substantially uniform across the array. This even distribution of lift-generating elements may contribute to aerodynamic stability and balanced lift during vertical takeoff, hovering, and landing operations. Furthermore, the rectangular symmetry of this arrangement facilitates predictable airflow patterns, reduces the likelihood of propeller wash interference, and enables coordinated thrust control for improved pitch, roll, and yaw adjustments during flight. The rectangular configuration also allows for modular adaptability, such that failure or deactivation of any single propeller can be compensated for by adjacent units to maintain controlled lift and stability, further enhancing the safety and reliability of the disclosed flight module system.

The flight module 1 further has a rear lateral wing 13 and a rear propeller 18, the rear propeller 18 being oriented substantially perpendicular to the lift generating propellers 5a-5h. The rear propeller 18 may be considered to be a thruster, as, for purposes of this disclosure, a "thruster" is defined as "a device that generates thrust", where "thrust" is defined as "a force that propels a vehicle in a first direction by accelerating fluid in a second direction anti-parallel to the first direction". For purposes of this disclosure, "anti-parallel" is defined as "having parallel vectors that point in opposite directions". Further disposed along the flight module 1 are four connectors 9a-9d that each connect to a respective connection point 6a-6d of the car 2 (to be discussed in FIG. 3) to secure the flight module 1 to the car 2.

Turning now to FIG. 3, FIG. 3 is a top and side perspective view of the car of FIG. 1 in an embodiment of the disclosed technology. The car 2 has four wheels 15a-15d (further shown in following drawings) and connection frames 4a and 4b, in which connection points 6a, 6b, 6c, and 6d (hereafter referred to as 6a-6d) are disposed. The connection points 6a-6d may be portals into which a respective connector 9a, 9b, 9c, and 9d (hereafter referred to as 9a-9d) (as shown in FIG. 2) is repeatedly insertable and removable for connection and disconnection of the flight module 1 from the car 2. Connection mechanisms such as (but not limited to) frictional engagement, screws, bearings, and threading may be employed to fortify the securement of the flight module 1 to the car 2 to sustain the variety of forces encountered during operation of the technology. The connection frames may connect to each respective wheel 15a-d at one connection point (such as 17b or 17c) per wheel. This connection may be facilitated via mechanisms such as (but not limited to) frictional engagement, screws, bearings, and threading. It should be noted that while FIG. 2 shows a side of the car 2 to which a singular connection frame 4b is connected, the opposite side of the car 2 to which connection frame 4a is affixed comprises analogous points 17a and 17d for connection of the connection frame 4a to the wheels 15a and 15d, respectively. With regard to the aforementioned components labelled in FIG. 3, the car 2 is symmetrical, and as such the construction of the car 2 shown applies to two sides thereof.

Figure 4:
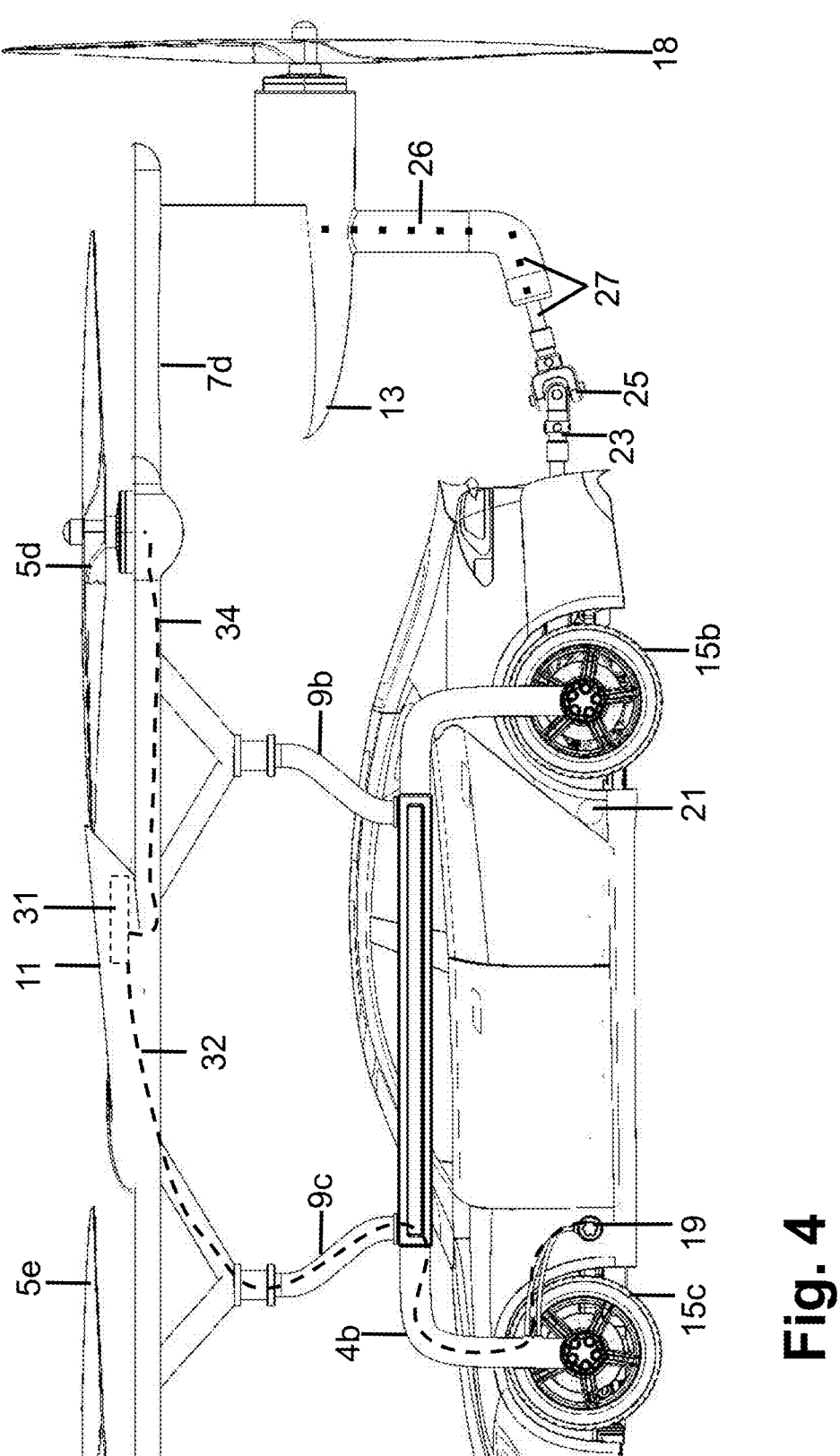
FIG. 4 is a side elevation view of the car with a flight module of FIG. 1 in an embodiment of the disclosed technology.
Figure 7:
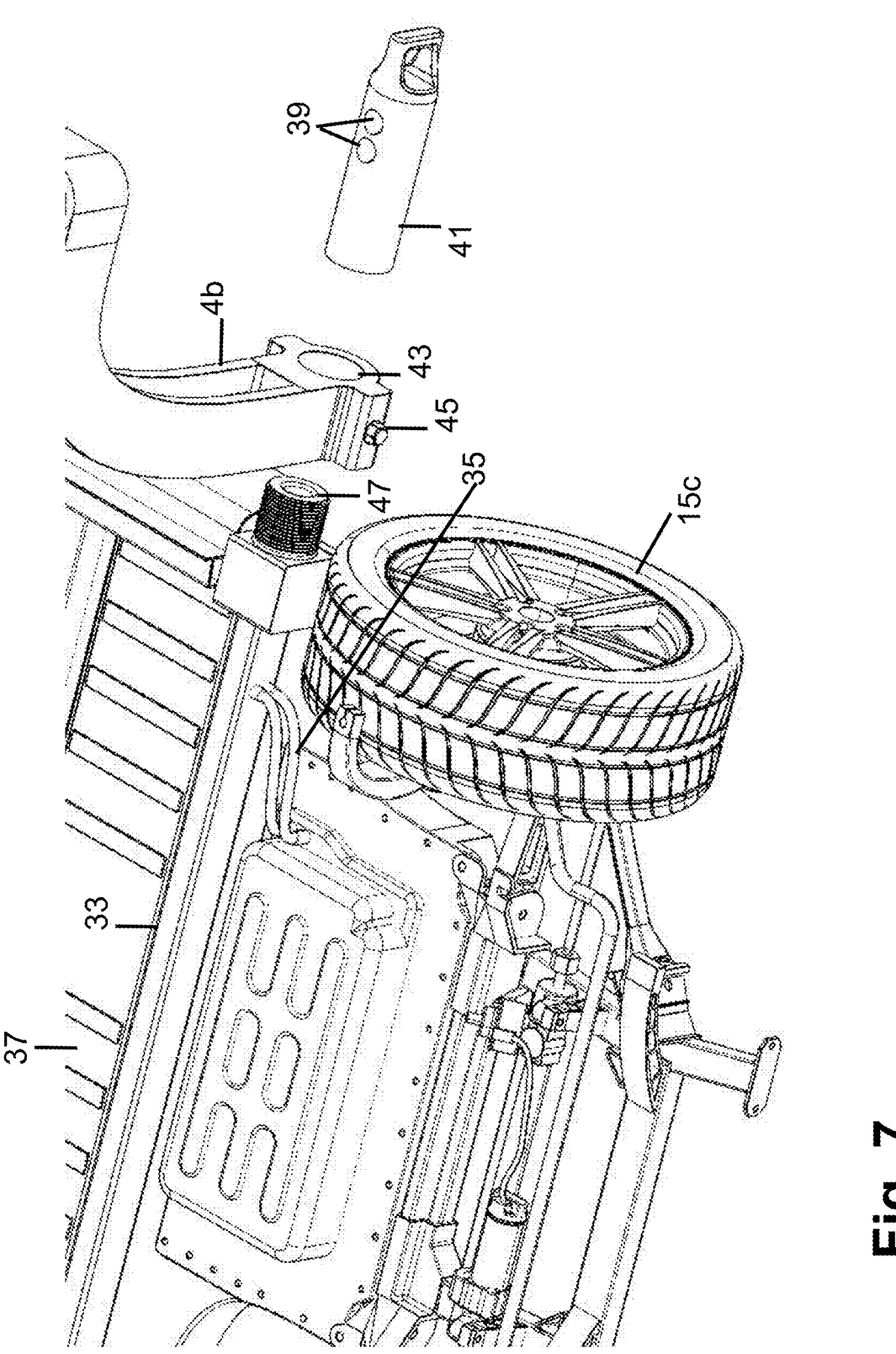
FIG. 7 is a closeup top and side perspective view of a car chassis of FIG. 5 and an exploded view of components thereof in an embodiment of the disclosed technology.

FIG. 4 is a side elevation view of the car with a flight module of FIG. 1 in an embodiment of the disclosed technology. The flight module 1 has a secondary energy storage 31 that is electrically connected to a primary energy storage (37, as shown in FIG. 7). The flight module 1 may draw power from the secondary energy storage 31 and/or the primary energy storage 37. The electrical connection 32 of the two energy storages 31 and 37 enables bidirectional electrical energy transference between the energy storages 31 and 37. This allows for operational flexibility, and enables a depleted battery comprising one of the energy storages 31 and 37 to be recharged by the other of the energy storages 31 and 37. The secondary energy storage 31 also has an electrical connection 34 to the rear propeller 18 of the flight module 1, the flight module 1 having internal gearing and fittings whose rotation is induced by electrical energy from the secondary energy storage 31. Thus, the secondary energy storage 31 transmits electrical energy that is converted to mechanical energy of the propeller 18 of the flight module 1.

The path along which this energy transmission and transduction is executed may be referred to as a "secondary transmission system", while a "primary transmission system" is encompassing of the internal gearing, fittings, and mechanisms described in greater detail herein-below that transmit and transduce energy from the primary energy storage to the motile automotive and aeronautical components of the vehicle of both the car module 2 and the flight module 1. Notably, the two transmission systems can operate simultaneously, such that the primary energy storage 31 and primary transmission system power both the car module 2 and the flight module 1. Alternatively, the secondary energy storage 31 and secondary transmission system may exclusively power the flight module 1, while the primary energy storage 37 and primary transmission system exclusively power the car module 2. The flexibility in energy transduction arrangement allows for modularity, redundancy in case of failure, and operational flexibility. "Transduction" is defined as "transference of a first energy form to a second energy form", such as electrical energy from an energy storage generating a torque to move an axle, which resultingly has mechanical energy.

The bidirectional electrical connection 32 extends from the primary energy storage 37 (see FIG. 8) to the singular connection frame 4b via point 19 and wiring 35, whereafter the bidirectional connection 32 proceeds to traverse a connector 9c and the upper wing 11 of the flight module 1 to connect to a secondary energy storage 31 disposed laterally across the interior of upper wing 11. In alternative embodiments, however, the secondary energy storage 31 may be disposed elsewhere within the flight module, with the bidirectional electrical connection 32 similarly being adapted to alternative placements of the energy storages 31 and 37.

The universal joint 25 may allow for two dimensional motion of the rotating shaft 27 relative to the rotating shaft 23, whilst maintaining connection there-between, in order to increase strength and prevent breakage upon encountering of turbulence during flight. The first rotating shaft 23 extends from a region interior to the vehicle 2, particularly within the gearbox 29 shown in FIG. 10 herein-below, to a region exterior to the vehicle 2. The rotating shafts 23 and 27 may be housed within, in part or in full, by tubular covers, with the dashed region of rotating shaft 27 being housed within a tubular cover 75 (see FIG. 9). A cover of electrical or mechanical equipment formed from cylindrical sections having different radii is still considered to constitute a "tubular cover" for purposes of this disclosure. Additionally, an end of rotating shaft 27 interfaces with a rotating shaft 26, transmitting torque thereto via a universal joint (not pictured) analogous to universal joint 25. Further rotating shafts and universal joint connections may be disposed within the rear propeller 18 to transmit torque from the motor axle 56 to the rear propeller 18. The rotating shafts 23 and 27 are offset from one at an obtuse angle 14a, while rotating shafts 27 and 26 are offset from one another at an obtuse angle and 14b (shown in FIG. 5).

Figure 5:
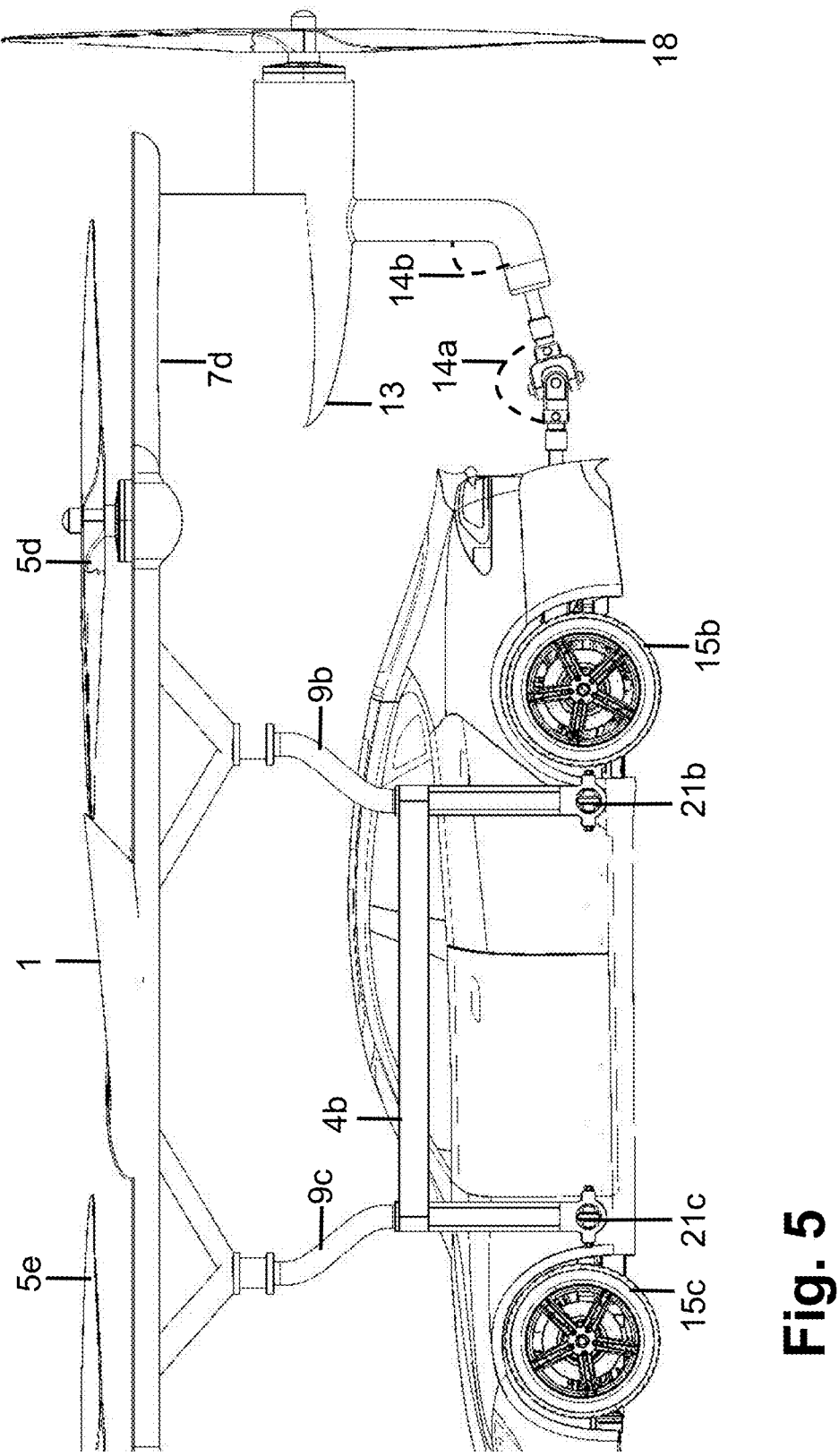
FIG. 5 is a side elevation view of a car with a flight module in an embodiment of the disclosed technology.

FIG. 5 is a side elevation view of a car with a flight module in an embodiment of the disclosed technology. It should be noted that the highest point reached by a propeller blade of the rear propeller 18 is higher than the highest point reached by a propeller blade of the lift generating propellers 5a-5h, the heights of the highest points being measured with reference to vertical displacement from an upper edge of a connecting frame 4a or 4b. Furthermore, in the present embodiment, the connection frames 4a and 4b connect to the car 2 at connection points 21a, 21b, 21c, and 21d (hereafter referred to as 21a-21d), as opposed to points 17a, 17b, 17c, and 17d (hereafter referred to as 17a-17d) central to the wheels 15a, 15b, 15c, and 15d (hereafter referred to as 15a-15d) as shown in prior embodiments. Choice of connection points may take into account factors such as center of gravity, spacial constraints, aerodynamics, and aesthetic considerations.

Figure 14:
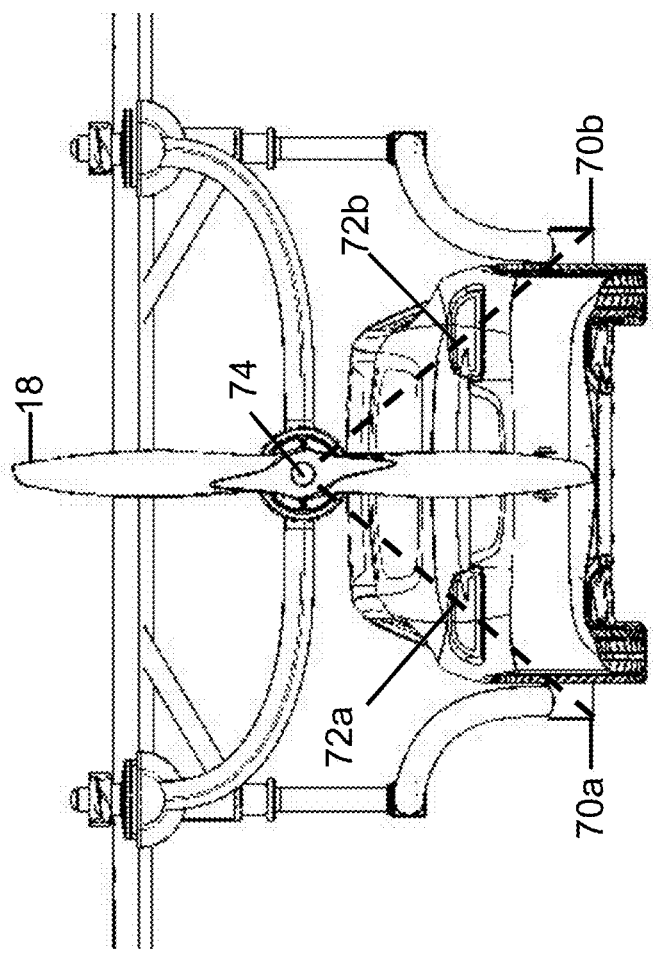
FIG. 14 is a rear elevation view of a car with a flight module in an embodiment of the disclosed technology.

Skipping to FIG. 14, FIG. 14 is a rear elevation view of a car with a flight module in an embodiment of the disclosed technology. This figure illustrates the spatial symmetry of the vehicle's chassis relative to the rear-mounted thrust-generating propeller 18. Specifically, the rear corners of the chassis 70a and 70b are linearly equidistant with equal lengths 72a and 72b, respectively, from the central axis of rotation 74 of the rear propeller 18. This symmetrical spacing ensures that the propeller is centered with respect to the chassis in the lateral direction, which promotes balanced thrust distribution during flight. By positioning the axis of rotation 74 equidistantly from both corners 70a and 70b, the propulsion system can deliver uniform forward motion without inducing unwanted yaw or lateral drift, thereby enhancing directional stability and aerodynamic control during aerial operation.

Turning back now to FIG. 6, FIG. 6 is a top and side perspective view of a car chassis of the car of FIG. 3 in an embodiment of the disclosed technology. The chassis comprises wheels 15a-15d, which are coupled in pairs via front and rear axles. Structural support for the chassis is provided by connection frames 4a and 4b, which span laterally and longitudinally to maintain vehicle rigidity and support component mounting. Disposed at the rear of the chassis is a gearbox 29, which is enclosed within a protective housing and contains internal gearing used to toggle between automotive travel, where mechanical energy is directed to the axles and wheels, and aeronautical travel, where mechanical energy is instead directed to the flight module. The interior of the gearbox 29, including the toggle mechanism and associated gears, is shown in greater detail in FIGS. 10, 11, 12, and 13.

Figure 6:
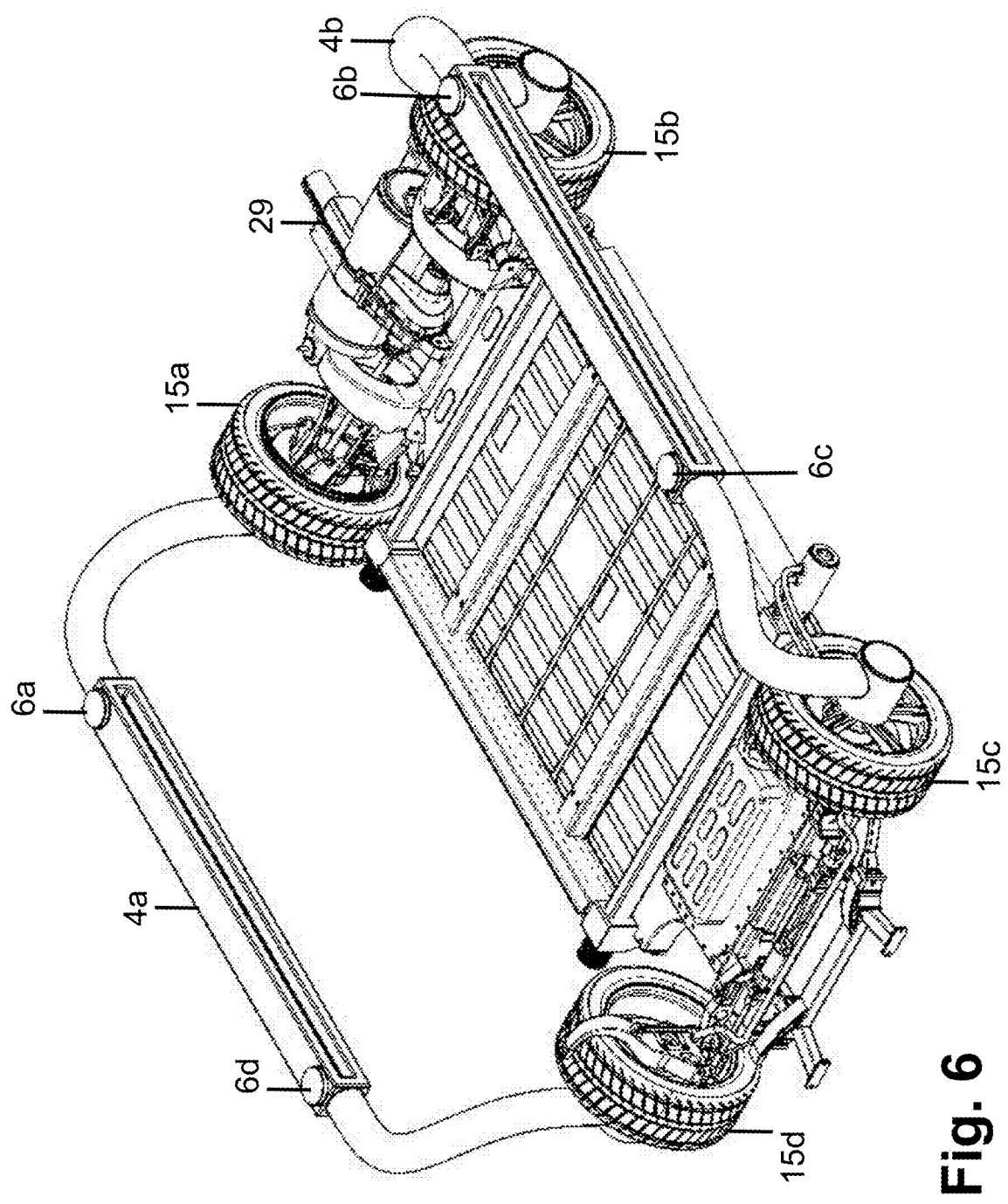
FIG. 6 is a top and side perspective view of a car chassis of the car of FIG. 3 in an embodiment of the disclosed technology.
Figure 8:
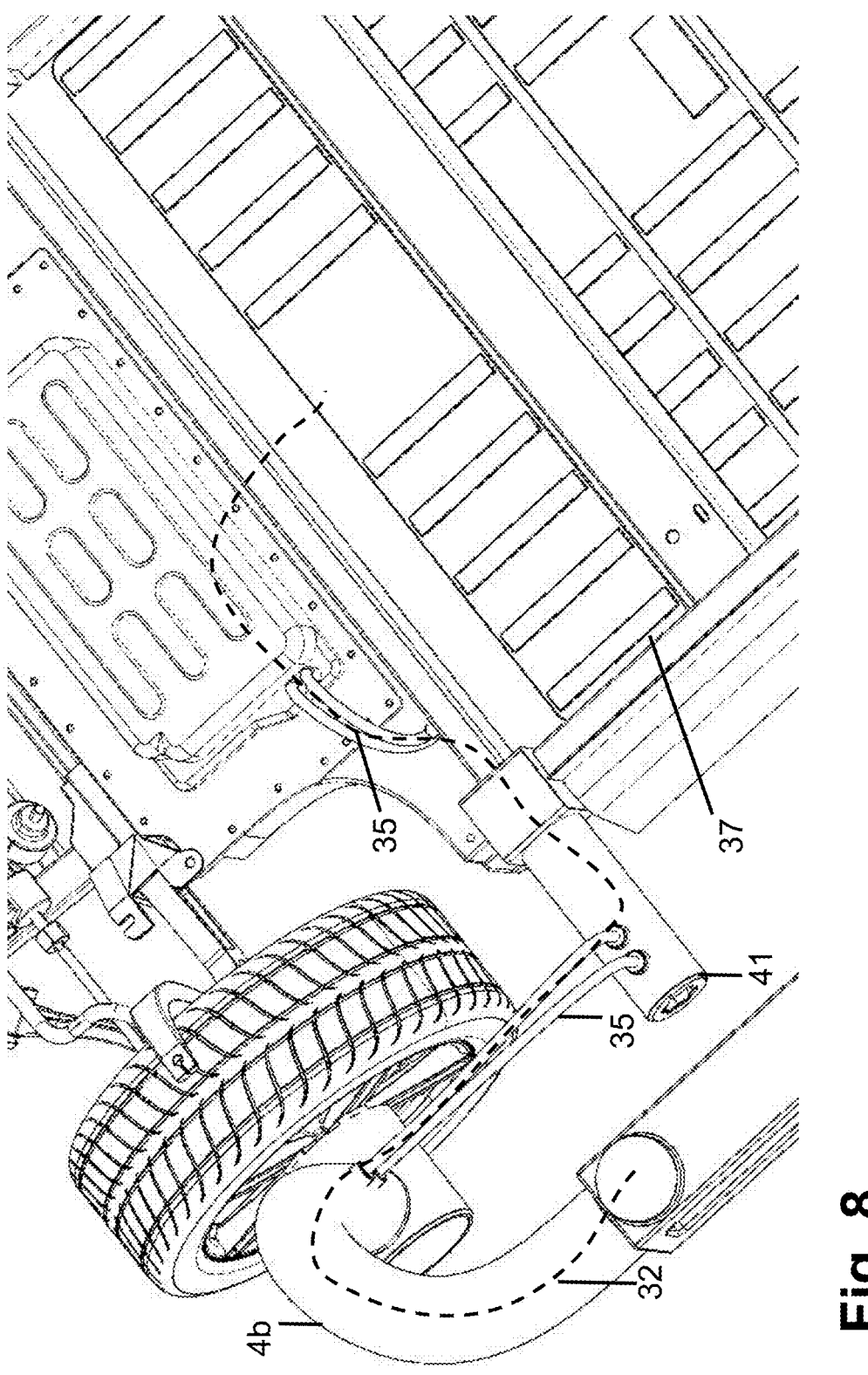
FIG. 8 is a closeup top and side perspective view of the car chassis of FIG. 6 in an embodiment of the disclosed technology.

Skipping to FIG. 8, FIG. 8 is a closeup top and side perspective view of the car chassis of FIG. 6 in an embodiment of the disclosed technology. This view provides greater detail of the electrical interface between the vehicle body and the flight module. Wiring 35 is routed along the chassis to conduct electricity from the primary energy storage 37 to downstream components. Specifically, wiring 35 transmits electrical energy via a connector pin 41, which interfaces with the connecting frame 4b. The connecting frame 4b functions as a conduit or hub for routing electrical power to various components of the flight module, including one or more propellers or thrust-generating systems mechanically and electrically connected to the frame. The connector pin 41 may be removably coupled to allow disconnection of the flight module when not in use, enhancing modularity and serviceability. The electrical connection established through the wiring and connector facilitates controlled activation of flight components during aeronautical travel. These components and their functional roles are discussed in greater detail below and are shown in subsequent figures, including FIGS. 9 through 13. FIG. 7, meanwhile, is a closeup top and side perspective view of the car chassis and an exploded view of various components in an embodiment of the disclosed technology. This figure illustrates the mechanical and electrical interface between the vehicle body and flight module in greater detail. A front reinforcement bar 33 is positioned behind the primary energy storage 37 and provides structural support to the front portion of the chassis. The reinforcement bar 33 includes threaded ends 47 configured to receive locking components for secure attachment of interfacing parts.

A removable connector pin 41, which includes two embedded electrodes 39, is inserted through a bore 43 formed in the connecting frame 4b. After insertion, the pin 41 is rotated so that its inner surface threads engage with the corresponding threading 47 of the reinforcement bar 33, establishing a secure mechanical connection. To further stabilize the connection and prevent loosening due to vibration or movement during travel, a pair of oppositely-disposed bolts 45 is tightened against the connector pin 41, applying a frictional force that immobilizes the assembly. The connector pin 41 also functions as an electrical interface. Wiring 35 transmits electrical energy from the primary energy storage 37 to internal conductors within the pin. The two electrodes 39 embedded in the pin serve to carry current across the mechanical interface to components of the flight module, thereby enabling their operation. This configuration allows for modular attachment and removal of the flight module while maintaining a reliable electrical and mechanical link between the vehicle and its aerial components.

Figure 9:
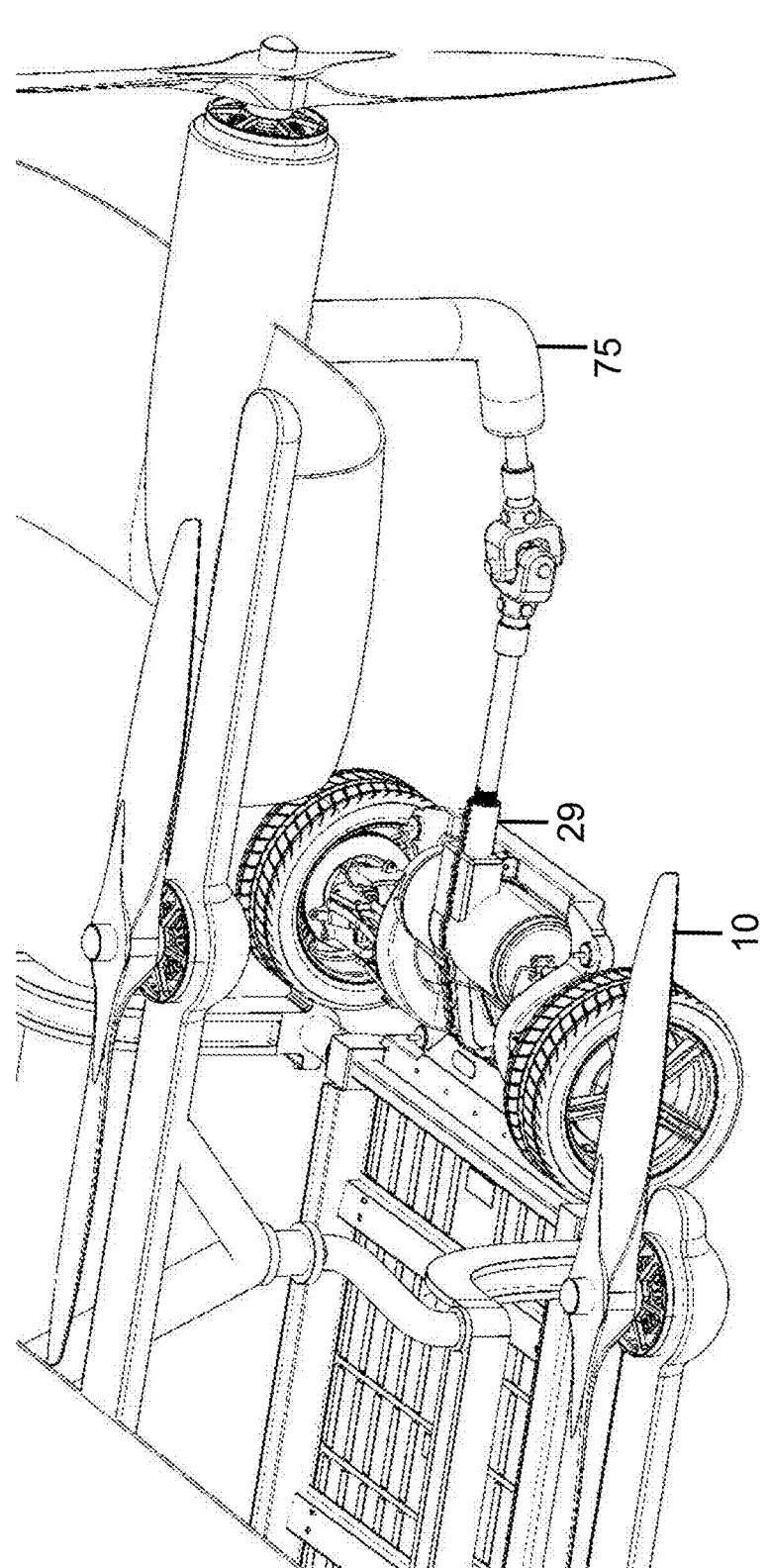
FIG. 9 is a top and side perspective view of a car chassis of FIG. 5 and flight module in an embodiment of the disclosed technology.

FIG. 9 is a top and side perspective view of the car chassis in combination with a flight module, in an embodiment of the disclosed technology. Electrical energy conducted from the primary energy storage 37, via wiring 35 and the connector pin 41 with embedded electrodes 39, is delivered to at least one lift-generating propeller 10. In the embodiment shown, a total of eight lift-generating propellers 10 are disposed, each pair positioned proximally to one of the four wheels 15a-15d. These propellers 10 may be mounted at or near the wheel centers, forming an aeronautical propulsion and lift system that is distributed across the chassis for balanced vertical thrust. Each lift-generating propeller 10 may operate as part of a discrete flight module or as a portion of a broader flight module 1, such as illustrated in FIG. 2. In some embodiments, the eight distributed lift-generating propellers 10 alone may comprise the full flight module, configured to provide sufficient vertical lift for takeoff and landing. In other embodiments, these propellers 10 may function in tandem with additional components of the flight module 1, including thrust-generating propellers, wings, or thrusters, to achieve and sustain flight.

The placement of the lift-generating propellers 10 near the wheels 15a-15d allows for efficient use of the existing chassis structure to support the vertical lift hardware. This configuration enables modularity in flight capability while preserving the ground-travel functionality of the vehicle when the flight module is detached or deactivated.

Figure 10:
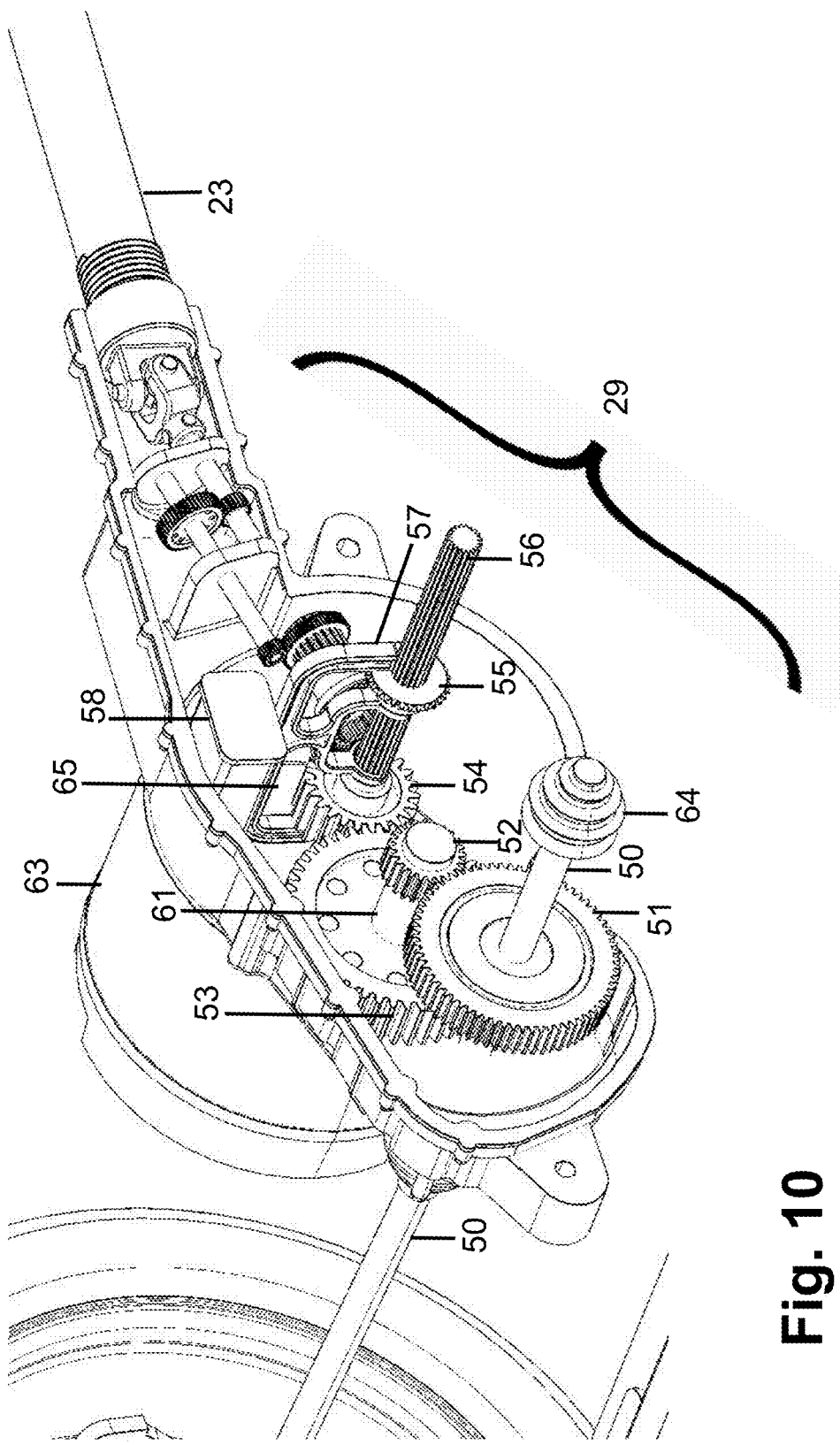
FIG. 10 is a cut away view of a gear box with a switch toggled for automotive travel of a car with a flight module in an embodiment of the disclosed technology.

Turning to FIG. 10, FIG. 10 is a cut away view of a gear box 29 with a switch toggled for automotive travel of a car with a flight module in an embodiment of the disclosed technology. A shaft 56 is rotated by a motor 63, and a gear selector fork 57 is disposed in a first position, such that a first gear 54 interfaces with a second and larger gear 53. The gear selector fork 57 is moveable along the shaft 56, with movement being initiated and guided by the toggle 58 with an outcropping 65 disposed within and traversing a segment of the gear selector fork 57. The outcropping 65, the gear selector fork 57, and the gears 54 and 55 are all repeatedly moved uniformly and bidirectionally with respect to the shaft 56, with the gears 54 and 55 continuously traversed by and contacting the shaft 56, albeit at changing points of the shaft 56 with movement of the outcropping 65. Rotation of the second larger gear 53 causes rotational motion of a third gear 52 coaxially disposed with the second gear 53 along a common central shaft 61. The third gear interfaces with a fourth gear, alternatively referred to as a wheel axle gear, 51, which is traversed by a central shaft 50 that constitutes a car axle. An end of the car axle 50 has an attachment site 64 about which a wheel 15a-15d (shown in prior drawings) is disposed. Thus, activation of the motor 63, when the gear selector fork is disposed in the first position/configuration, causes rotation of the wheels 15a-15d for automotive travel of the vehicle. For purposes of this disclosure, two gears are said to interface when the teeth of each gear are interspersed within teeth of the other respective gear, such that rotational motion of a first gear causes rotational motion of the other respective gear.

Figure 11:
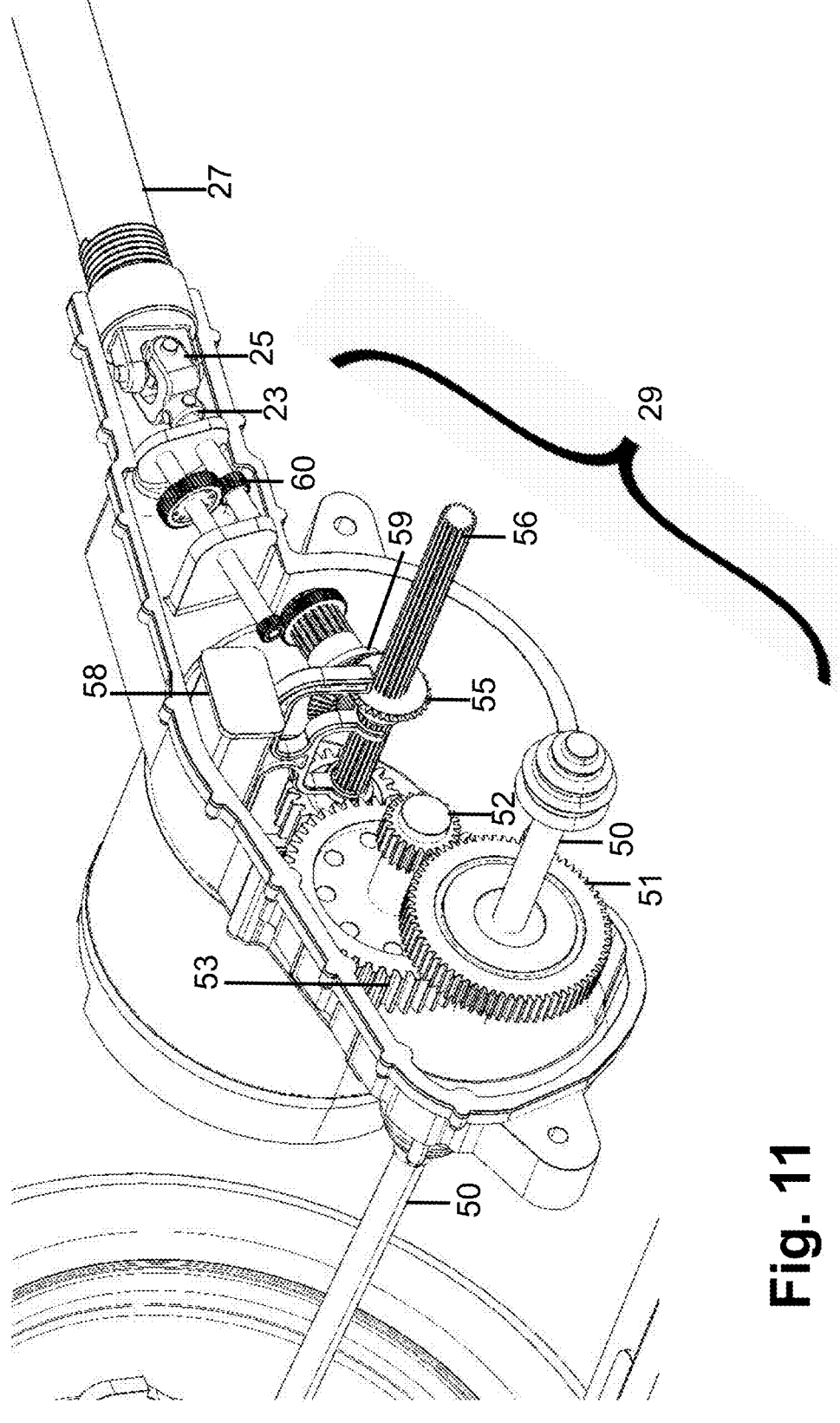
FIG. 11 is a cut away view of a gear box with a switch toggled for aeronautical travel of a car with a flight module in an embodiment of the disclosed technology.

Turning to FIG. 11, FIG. 11 is a cut away view of a gear box 29 with a switch toggled for aeronautical travel of a car with a flight module in an embodiment of the disclosed technology. The gear selector fork 57 is disposed in a second position, such that a gear 55 along the motor shaft 56 interfaces with a bevel gear 59, which in turn interfaces with gearing 60 that is adapted and sized to rotate a propeller of the flight module (such as 18 as shown in FIG. 5) with optimal rotational speed/angular velocity with respect to rotational speed/angular velocity of the motor shaft 56. Described differently, the gearing 60 is customizable to increase or decrease rotations per minute (rpm) of the propeller for a given rpm of the motor 63. For purposes of this disclosure, a "switch" and a "toggle" are defined as "a mechanism repeatedly transferable between at least a first state and a second state, whereby the mechanism transfers mechanical energy to different endpoints in the first state and the second state". For purposes of this disclosure, "repeatedly" is defined as "at least 100 times without loss of functionality". Internal wiring and/or mechanics within the dual mode vehicle allow for a user to direct the switching and maintenance of the toggle 57 between the two states described herein.

Figure 12:
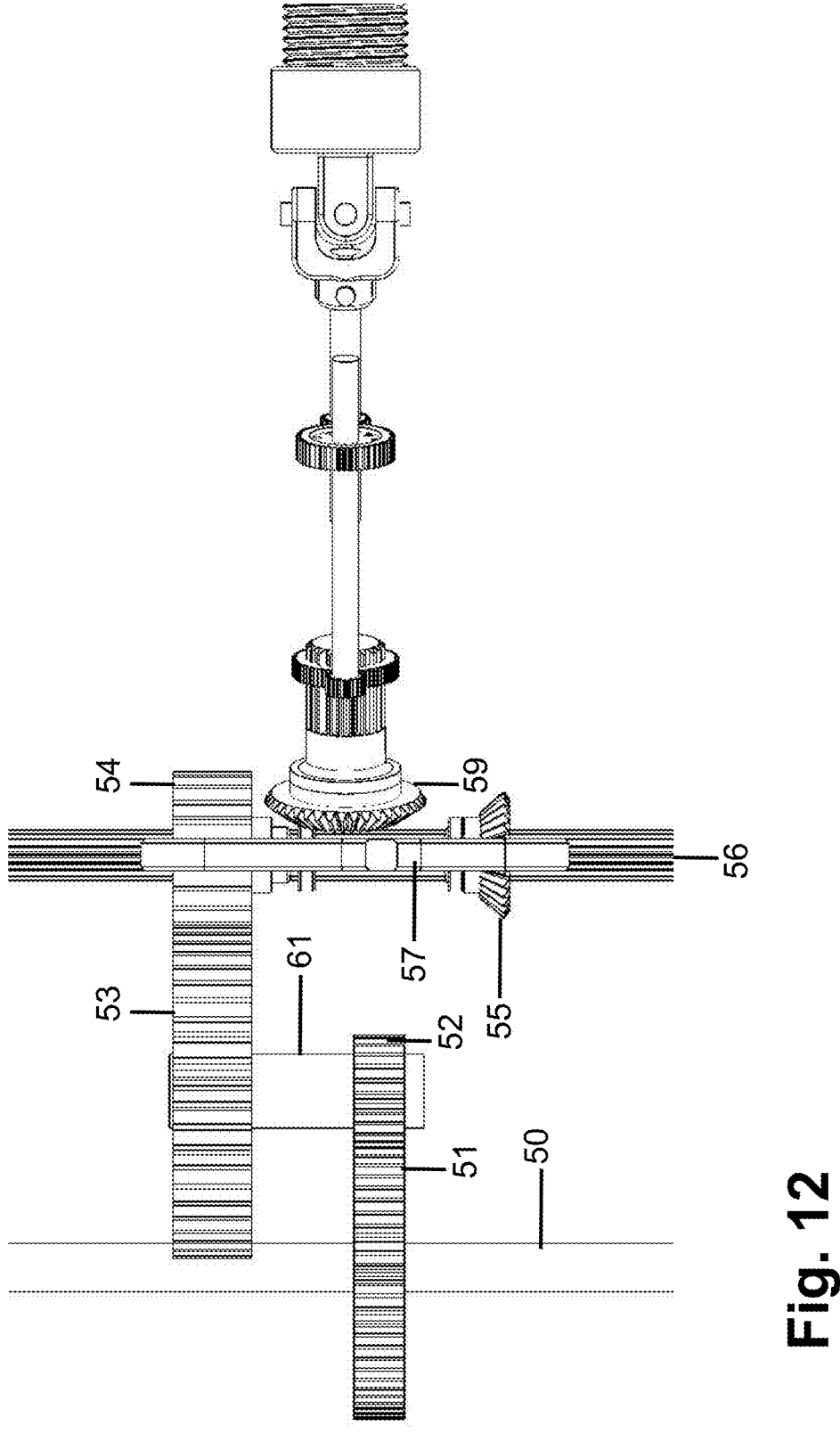
FIG. 12 is a top elevation view of the gearing and switch mechanism as configured as in FIG. 10 for automotive travel in an embodiment of the disclosed technology.

FIG. 12 is a top elevation view of the gearing and switch mechanism as configured as in FIG. 10 for automotive travel in an embodiment of the disclosed technology. In the first state of the toggle, gears 53 and 54 interface, such that rotation of the shaft 56 rotates gear 54, which in turn rotates gear 53. Gear 53 rotates the inter-gear shaft 61, to which a gear 52 is coupled. An axle gear 51 is coupled to gear 52 and traversed along an axis of rotational symmetry by wheel axle 50. Thus, with the described configuration, rotation of the motor shaft 56 rotates the wheel axle 50. All gears may be traversed by respective axles/shafts at respective center points, with the respective axles/shafts lying along an axis of rotational symmetry of each respective gear affixed thereto.

Figure 13:
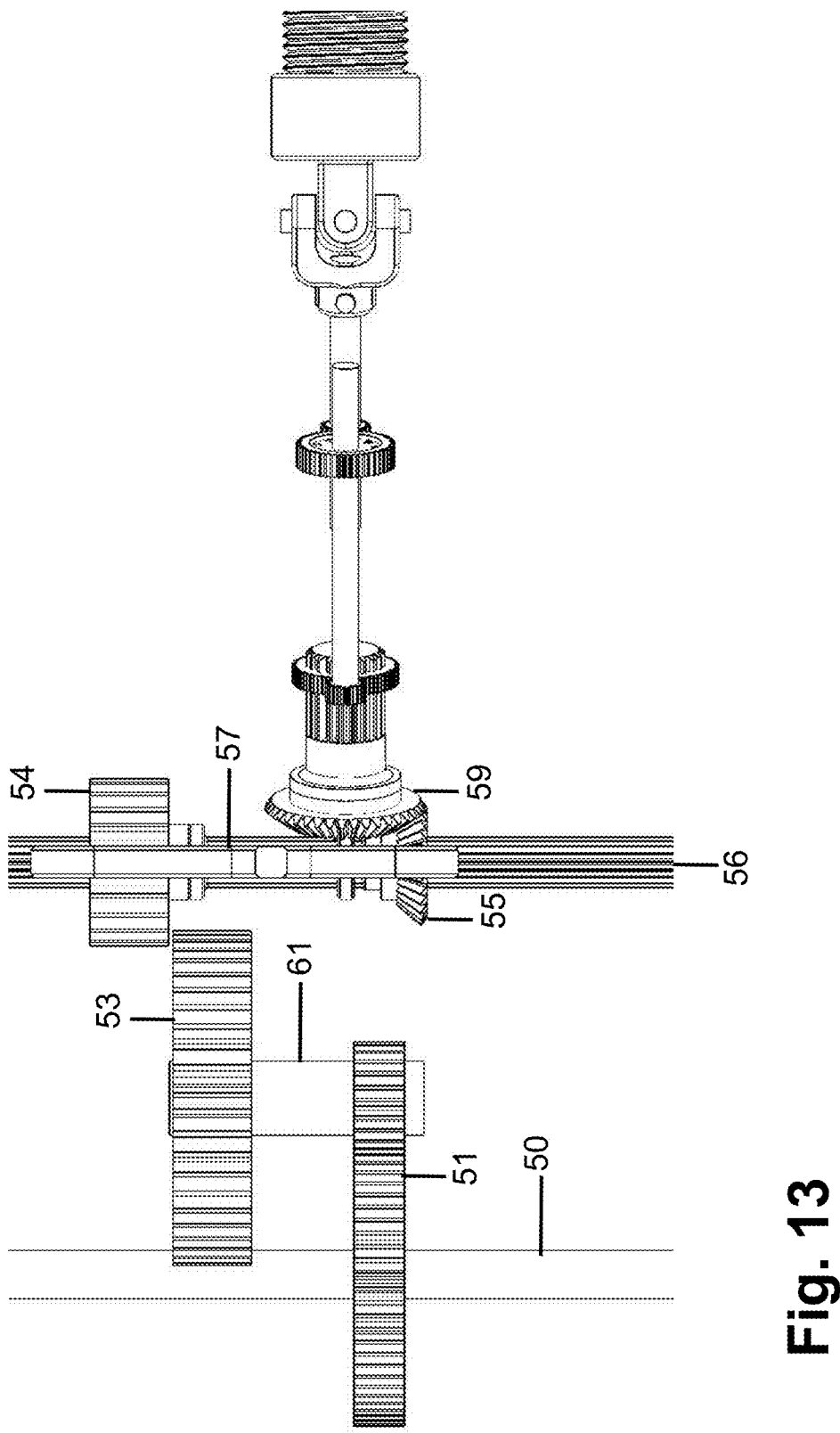
FIG. 13 is a top elevation view of the gearing and switch mechanism configured as in FIG. 11 for aeronautical travel in an embodiment of the disclosed technology.

FIG. 13 is a top elevation view of the gearing and switch mechanism configured for aeronautical travel, corresponding to the configuration shown in FIG. 11, in an embodiment of the disclosed technology. In the aeronautical configuration, gears 53 and 54 are mechanically disengaged from one another. That is, no rotational force is transmitted between these two gears, as their alignment and spacing are configured such that their teeth do not interlock. This intentional disengagement ensures that torque from the motor shaft is not delivered to the drivetrain responsible for rotating the vehicle's wheels 15a-15d, thereby isolating the ground-based propulsion system during flight.

Instead, mechanical engagement is established between gears 55 and 59. In this configuration, rotation of the motor shaft 56 causes gear 55, which is affixed to the shaft, to transmit torque directly to a bevel gear 59. The bevel gear 59 is oriented at an angle, which may be 90 degrees in embodiments, to translate the horizontal rotation of the motor shaft into a vertical or angled rotational axis. This redirection of force enables the power output to drive aeronautical components, including one or more thrust-generating or lift-generating propellers. In particular, the torque transmitted through bevel gear 59 is used to actuate a separate gearing system that ultimately rotates the rear propeller 18, which serves as a primary source of horizontal thrust during flight. This reconfiguration of mechanical pathways is facilitated by the toggle switch mechanism (referenced in FIGS. 10 through 12), which physically shifts internal gearing components or coupling interfaces to selectively engage or disengage certain drive paths. Thus, the same motor to selectively power either the ground-based propulsion system or the aeronautical propulsion system, but not both simultaneously, thereby optimizing energy use and enabling distinct modes of travel through a mechanically efficient, toggle-based transmission system.

For purposes of this disclosure, the term "substantially" is defined as "at least 95% of and up to and including 100% of" the term which it modifies.

Any device or aspect of the technology can "comprise" or "consist of" the item it modifies, whether explicitly written as such or otherwise.

Any device or step to a method described in this disclosure can comprise or consist of that which it is a part of, or the parts that make up the device or step. The term "and/or" is inclusive of the items which it joins linguistically and each item by itself.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described herein above are also contemplated and within the scope of the invention.

The invention claimed is:

1. A vehicle comprising:
a vehicle body including:
  a chassis;
  at least one connection element disposed at a side of said vehicle body and above the chassis; and
  a driving module, said driving module having at least one pair of wheels with a connecting axle therebetween, said driving module adapted for use during terrestrial travel;
a motor within said vehicle body generating mechanical energy from a primary energy storage;
a primary transmission system selectively transmitting mechanical energy from said motor to a target component of said vehicle; and
a flight module selectively attachable and detachable from connection points disposed on said at least one connection element of said vehicle body and mechanically coupleable to said vehicle body, such that when the fight module is attached to the at least one connection element, at least a portion of the flight module is disposed vertically above said vehicle body, said flight module adapted for use during aeronautical travel of said vehicle;
a user-operated toggle repeatedly switchable between a first state and a second state;
wherein:
  in said first state, said target component is said connecting axle; and
  in said second state, said target component is said flight module.

2. The vehicle of claim 1, wherein the flight module comprises at least one of: wings, propellers, and thrusters.

3. The vehicle of claim 2, wherein said flight module comprises a secondary energy storage and secondary transmission system, said secondary transmission system transmitting mechanical energy from said secondary energy storage to said flight module; and
wherein a combination of said primary transmission system and said secondary transmission system are designed to simultaneously transmit mechanical energy to said flight module.

4. The vehicle of claim 3, wherein said primary energy storage and said secondary energy storage are electrically coupled to each other such that energy is bidirectionally transferable between said first energy storage and said second energy storage.

5. The vehicle of claim 3, wherein said primary energy storage supplies energy to both said primary transmission system and said secondary transmission system in the event of said secondary energy storage failing to cause said second transmission system to send mechanical energy to said flight module.

6. The vehicle of claim 3, wherein said secondary energy storage supplies energy to both said primary transmission system and said secondary transmission system in the event of said primary energy storage failing to cause said primary transmission system to send mechanical energy to said driving module.

7. The vehicle of claim 1, wherein said at least one connection element connects to central points of said wheels and said flight module connects to said vehicle body via said at least one connection element, thereby connecting to said vehicle body via one central point of each wheel.

8. The vehicle of claim 2, wherein said flight module comprises a lift generating propeller and a thrust generating propeller adjoined to a lift generating wing, wherein said thrust generating propeller is separate and distinct from said lift generating propeller.

9. The vehicle of claim 8, wherein:

said thrust generating propeller is coupled to said connecting axle via a plurality of rotating shafts, wherein each said rotating shaft of said plurality of rotating shafts is connected to at least one other said rotating shaft of said plurality of rotating shafts via a universal joint allowing for two dimensional freedom of movement.

10. The vehicle of claim 9, wherein:

at least one rotating shaft of said plurality of rotating shafts extends from within said vehicle body to a region exterior to said vehicle body; and each said rotating shaft of said plurality of rotating shafts is angularly offset at an obtuse angle from a respective adjacent rotating shaft of said plurality of rotating shafts.

11. The vehicle of claim 9, wherein a rotational axis of said thrust generating propeller is equidistant from two back corners of said chassis.

12. The vehicle of claim 8, wherein said lift generating propeller and said thrust generating propeller are offset 90 degrees from one another, and an extremity of said thrust generating propeller reaches to a point higher than a highest point of said lift generating propeller.

13. A method of use of the vehicle of claim 1, the method comprising steps of:

(a) mechanically attaching said flight module to said at least one connection element;

(b) setting said user-operated toggle to said first state;

(c) automotively accelerating said vehicle using mechanical energy provided to said driving module via said primary transmission system;

(d) switching said user-operated toggle to said second state;

(e) supplying said mechanical energy from said primary energy storage to said flight module via said primary transmission system;

(f) ceasing vehicular acceleration production via said driving module;

(g) generating lift via said flight module; and (h) taking off, such that said at least one pair of wheels lose contact with the ground, and said vehicle is airborne.

14. The method of use of the vehicle of claim 13, the method further comprising, between steps (e) and (f), a step of producing vehicular acceleration via both said driving module and said flight module using mechanical energy supplied via said primary transmission system.

15. The method of use of the vehicle of claim 13, further comprising steps of:

(i) reducing mechanical energy supplied to said flight module via said primary transmission system;

(j) descending;

(k) contacting said at least one pair of wheels to the ground;

(l) switching said user-operated toggle to said first state;

(m) ceasing transmission of mechanical energy to said flight module, and supplying mechanical energy exclusively to said driving module via said primary transmission system; and (n) resuming automotive travel.

16. A method of use of the vehicle of claim 13, the method comprising steps of:

(a) mechanically attaching said flight module to said at least one connection element;

(b) setting said user-operated toggle to said first state;

(c) automotively accelerating said vehicle using mechanical energy provided to said driving module via said primary transmission system;

(d) switching said user-operated toggle to said second state (e) simultaneously supplying said mechanical energy from said primary energy storage to said flight module via said primary transmission system and supplying mechanical energy from said secondary energy storage to said flight module via said secondary transmission system;

(f) ceasing mechanical energy transfer to said driving module;

(g) generating lift via said flight module; and (h) taking off, such that said at least one pair of wheels lose contact with the ground, and said vehicle is airborne.

17. The method of use of the vehicle of claim 16, further comprising a step (i) of ceasing mechanical energy transfer via said secondary transmission system to said flight module.

18. The method of use of the vehicle of claim 16, further comprising steps, executed at any point during the method, of:

(i) of establishing energetic connection between said primary energy storage and said secondary energy storage; and (j) transferring energy from either said secondary energy storage to said primary energy storage or from said primary energy storage to said secondary energy storage.

19. The method of use of the vehicle of claim 18, further comprising steps of:

(k) reducing mechanical energy supplied to said flight module via said primary transmission system;

(l) descending;

(m) contacting said at least one pair of wheels to the ground;

(n) switching said user-operated toggle to said first state;

(o) ceasing transmission of mechanical energy to said flight module, and supplying mechanical energy exclusively to said driving module via said primary transmission system and/or said secondary transmission system; and (p) resuming automotive travel.

20. A method of use of the vehicle of claim 1, the method comprising steps of:

(a) mechanically attaching said flight module to said at least one connection element;

(b) setting said user-operated toggle to said second state;

(c) supplying mechanical energy from said primary energy storage to said flight module via said primary transmission system;

(d) generating lift via said flight module;

(e) taking off, such that said at least one pair of wheels lose contact with the ground, and said vehicle is airborne;

(f) reducing mechanical energy supplied to said flight module via said primary transmission system;

(g) descending; and (h) contacting said at least one pair of wheels to the ground.

21. The method of use of the vehicle of claim 20, further comprising, before step (d), steps of:

(i) establishing energetic connection between said primary energy storage and said secondary energy storage; and (j) transferring energy from either said secondary energy storage to said primary energy storage or from said primary energy storage to said secondary energy storage (k) simultaneously supplying said mechanical energy from said primary energy storage to said flight module via said primary transmission system and supplying mechanical energy from said secondary energy storage to said flight module via said secondary transmission system.

22. The vehicle of claim 1, wherein said flight module connects to said vehicle body at a plurality of points disposed on said vehicle body.

* * * * *